(12) United States Patent
Xu et al.

(10) Patent No.: US 8,578,372 B2
(45) Date of Patent: Nov. 5, 2013

(54) BUSINESS-IN-A-BOX INTEGRATION SERVER AND INTEGRATION METHOD

(75) Inventors: Jian Xu, San Jose, CA (US); Da Shuang He, Shanghai (CN); Yi Zhen Xu, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 1111 days.

(21) Appl. No.: 12/501,668

(22) Filed: Jul. 13, 2009

(65) Prior Publication Data

US 2010/0042991 A1 Feb. 18, 2010

(30) Foreign Application Priority Data

Aug. 15, 2008 (CN) .......................... 2008 1 0210423

(51) Int. Cl.
*G06F 9/45* (2006.01)

(52) U.S. Cl.
USPC ........................................................ 717/178

(58) Field of Classification Search
USPC ........................................................ 717/178
See application file for complete search history.

(56) References Cited

U.S. PATENT DOCUMENTS

| | | | | |
|---|---|---|---|---|
| 6,557,054 | B2* | 4/2003 | Reisman | 710/33 |
| 7,395,540 | B2* | 7/2008 | Rogers | 719/310 |
| 7,890,601 | B2* | 2/2011 | Schaeck | 709/217 |
| 2004/0181471 | A1* | 9/2004 | Rogers | 705/31 |
| 2006/0242640 | A1* | 10/2006 | Pauly et al. | 717/174 |

FOREIGN PATENT DOCUMENTS

| | | |
|---|---|---|
| CN | 101018152 A | 8/2007 |
| CN | 101119231 A | 2/2008 |

OTHER PUBLICATIONS

High-Performance, Enterprise Ready Fingerprint System Integration, Without the SDK in 24 Hours.—Radiant Network—Biometrics Fingerprint Hardware and Software—http://biometrics. radiantnetwork.bom/proddetail.php?prod-BPAS.
Toolfarm. The Visual Effexperts—Toolfarm News: Toolfarm—Plugins, Software Sale and Distribution—New FxPlug Version for FCP & Motion—http://toolfarm.com/labels/QC%20FX.html.
MCRO TCA : Individual Components and Complete Systems—Electronics Packaging for Automation, system, Integration, cases, chassis, rack, plug-in.—AdvancedTCA—Advanced MC—MicroTCA—http://www.schroff.co.uk/internet/html_e/service/pressreleases/fa705.html.

* cited by examiner

*Primary Examiner* — John Chavis
(74) *Attorney, Agent, or Firm* — Yuanmin Cai

(57) ABSTRACT

The present invention is related to a business-in-a-box (BiB) integration server and BiB integration method. The BiB integration server includes a software package acquisition module for acquiring the installation package of at least one piece of software according to an installation information; a software installation module, for installing at least one piece of software on at least one hardware platform that constitutes the BiB according to the installation information; and a software package transmission module, for transmitting the software installation package to at least one client terminal. The present invention further provides a BiB service system, comprising a BiB apparatus, and a BiB remote console for controlling the BiB apparatus. Further, the present invention provides a BiB integration method corresponding to the BiB integration server. Through the apparatus and method, it is achieved flexible integration of hardware and software, allowing a third party to freely plug in new software and to manage the installed software.

19 Claims, 3 Drawing Sheets

BUSINESS-IN-A-BOX INTEGRATION SERVER AND INTEGRATION METHOD

CROSS-REFERENCE TO RELATED APPLICATION

The present application claims the benefit of priority to a Chinese Patent Application Serial Number 200810210423.0, entitled "BUSINESS-IN-A-BOX INTEGRATION SERVER AND BUSINESS-IN-A-BOX INTEGRATION METHOD", filed Aug. 15, 2008 with the State Intellectual Property Office (SIPO) of the People's Republic of China, the content of which is incorporated herein by reference in its entirety.

TECHNICAL FIELD OF THE INVENTION

The present invention relates to the integration service of computer systems and more specifically to a Business-in-a-box integration server and integration method for plugging in additional software in integrated computer systems in field.

BACKGROUND OF THE INVENTION

For most small and medium enterprises, the primary focus is running business smoothly rather than managing complex IT infrastructure. Therefore, a solution shall be developed and provided to the small and medium enterprises to combine modular components of their IT infrastructure, thereby supplying a simple and feasible module integration method and providing various specific combinations of services. However, in many cases, system integration is a headache work. Even some seemingly simple hardware and software bundle still creates a lot of hassles. Current integrated solution often provides a hardware platform and a set of specific pre-installed software stack on it. In other words, what is provided is usually a special purpose appliance that lacks flexibility and future extendibility. It is difficult to install additional software into the system to meet the additional requirements. Installing and integrating the additional software applications will encounter complexity and greatly increase the cost. Furthermore, managing these software applications is often complicated. Therefore, the total cost of ownership (TCO) is high.

SUMMARY OF THE INVENTION

In view of above, a simplified hardware and software integration solution is needed to facilitate the plug-in of third-party applications into the system, with ease in installation, configuration, management and use.

Based on the problems and aims above, provided in the present invention is a Business-in-a-box (BiB) integrated solution, permitting installation, configuration and management of third-party software, making the BiB system more flexible.

According to a first aspect of the present invention, there is provided a BiB integration server located in a BiB. In addition, the BiB also includes at least one hardware platform and the server includes a software package acquisition module, configured to acquire the installation package of at least one piece of software according to the installation information; a software installation module, configured to install at least one piece of software on at least one hardware platform that constitutes the BiB according to the installation information; and a software package transmission module, configured to transmit the software installation package to at least one client terminal.

According to a second aspect of the present invention, there is provided a BiB apparatus, including the BiB integration server according to the first aspect of the present invention.

According to a third aspect of the present invention, there is provided a BiB service system, which includes the BiB apparatus according to the second aspect of the present invention, and a BiB remote console for controlling the BiB apparatus.

According to a fourth aspect of the present invention, there is provided a BiB integration method, which includes acquiring the software installation package of at least one piece of software according to the installation information; installing the at least one piece of software on at least one hardware platform that constitutes the BiB according to the installation information; and transmitting the software installation package to at least one client terminal.

Through the apparatuses and methods according to the aspects of the present invention, a new semi-appliance is created that allows additional applications to be pulled in and managed, making the integration of hardware and software more flexible and usable.

BRIEF DESCRIPTION OF THE DRAWINGS

The embodiment of the present invention is described below in combination with the drawings, in which.

DETAILED DESCRIPTION OF THE EMBODIMENTS

Embodiments of the present invention provide an apparatus and a method of implementing a Business-in-a-box (BiB). In the present invention, BiB is a semi-appliance, i.e. when a business partner (BP) or an independent software vendor (ISV) receives the BiB, he gets a box of hardware, operating system and management software all integrated as a whole. All he needs to do is to plug in his industrial sector specific applications on the top of the BiB. For example, with bank management software installed into it, the BiB becomes a "bank in a box" that can provide bank related business service to the terminal computers of bank operators. Or with retail management software installed into it, the BiB becomes a "retail in a box" that can provide business such as product management to terminal computers of retailers. In this way, the owner of the BiB (e.g. BP or ISV) can define by himself what software to install on his hardware platform. Once the owner defined the software to be installed and the related configuration information through the integration tools of the BiB, the management software in BiB will automatically install the defined software stack on the hardware platform, configure the software applications and manage them.

Figure 1:
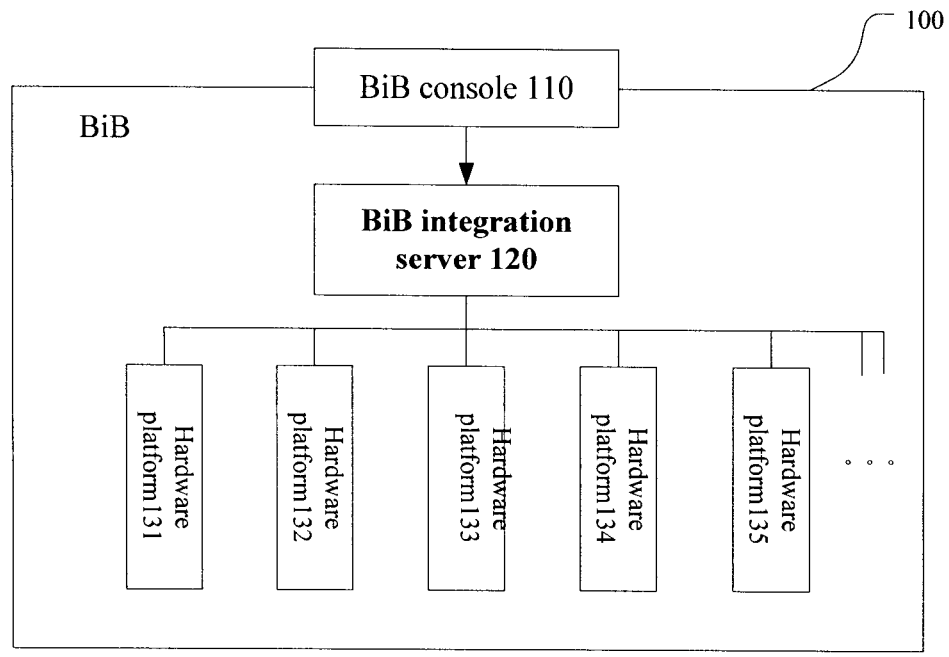
FIG. 1 is an illustration of architecture of a Business-in-a-box (BiB) according to an embodiment of the present invention.

In order to realize the above functions, provided in an embodiment according to the present invention is an apparatus that realizes the BiB. FIG. 1 illustrates the architecture of the BiB according to an embodiment of the present invention. As shown in the figure, the BiB is generally indicated by 100. Specifically, the BiB 100 comprises a BiB console 110, a BiB integration server 120, and hardware platforms 131-135. In the above BiB 100, the BiB console 110 is provided to receive the software installation information and other instructions. The BiB integration server 120 is connected with the BiB console 110 and hardware platforms 131-135, for implementing the installation and management of the software. The hardware platforms 131-135 are provided to host the installed software and save necessary data. It could be understood that the hardware platforms 131-135 are only illustrative. The BiB 100 could include more or less platforms as needed. For an illustrative purpose, the BiB integration server 120 resides in an independent hardware. However, it could be understood that the BiB integration server 120 can also share a common hardware platform with other software applications. In an embodiment, the BiB 100 is embodied as a blade box that comprises a plurality of blade servers, each hardware platform in the BiB 100 being embodied as a single blade server in the blade box. The BiB integration server 120 can be hosted on an independence blade server, or can be installed on a certain blade server together with other software applications.

Figure 2:
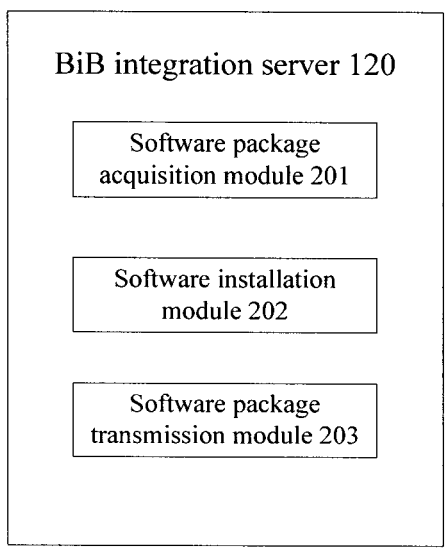
FIG. 2 is an illustration of architecture of the BiB integration server according to another embodiment of the present invention.

In order to realize the flexible integration of hardware and software in the BiB 100, the BiB integration server 120 has a functional module for the realization of software installation and management. FIG. 2 illustrates the architecture of the BiB integration server 120 according to an embodiment of the present invention. As shown in the figure, the BiB integration server 120 comprises a software package acquisition module 201, configured to acquire the software installation package of at least one piece of software according to the installation information, a software installation module 202, configured to install the at least one piece of software on the hardware platform of the BiB according to the installation information; and a software package transmission module 203, configured to transmit the software package to at least one client terminal.

The installation information of the present embodiment may include: name of the software, position of the installation files of the software, configuration information of the software, target hardware platform, etc. The installation information can be input into the BiB 100 by the owner of the BiB through the BiB console 110 as needed. For example, if the ISV hopes the BiB can become a "bank in a box" after receiving the box, he can input installation information of software related to bank business into the BiB through the BiB console 110. Or the installation information can also be transmitted to the BiB through a remote console by the end user of the BiB. For example, the end user of the BiB can be an IT administrator of a retail shop, and he can input the information of the software he needs to install that is related to retailing business through a remote console and transmit it to the BiB.

After acquiring the installation information through the BiB console, the software package acquisition module 201 acquires corresponding software installation package according to the installation information. The software installation package may comprise the installation files of the software, the software image file, the packaging configuration file and so on those are used for the installation of the software. In one embodiment, the software installation package of the software to be installed has already existed in the hardware platform of the BiB. For example, the needed software image has already been preloaded in the hardware platform hosting the integrated software stack (including the operating system). In such case, the software package acquisition module 201 only needs to poll or search out the software image from the BiB hardware platform. In another embodiment, the software installation package is stored in a remote hardware, such as a remote server. In such a case, the installation information usually contains the address of the remote server. The software package acquisition module 201 needs to acquire the software installation package from the remote server according to the address specified in the installation information. The communication and data transmission with the remote server can be realized through any means known in the art. For example, it can be realized through various protocols, either wired or wireless, e.g. FTP, HTTP, etc.

After acquiring the software installation package, the software installation module 202 can implement the installation of the software according to the installation information. In one embodiment, the installation information includes the information of the target hardware specified by the BiB owner or the end user. For example, the BiB owner can specify that certain software be installed in a certain blade server of the blade group that constitutes the BiB, or that it be installed in certain multiple blade servers. In such a case, the software installation module 202 installs the software in the specified one or more blade servers according to the information of target hardware. In another embodiment, the BiB owner or end user did not specify any hardware platform to install the certain software. In such a case, the software installation module 202 selects one or more platforms to implement the installation of the software according to the running conditions of the hardware platform. For example, the software installation module 202 can assess the coexistence relation between the operating system and the software and the resource available in each hardware platform, including memory space, operation performance, etc. According to the assessing result, the software is installed in the hardware platforms that are judged as suitable for the installation of new software. In one embodiment, in order to ensure silence installation, the end user or BiB owner can provide in the installation information the packaging configuration information of the software. Specifically, the packaging configuration information can be recorded in a flat file, whose filename is then input into the BiB through the BiB console. The flat file may reside in the computer terminal of the end user, or in a remote server. In this way, the software installation module 202 can install the software in the hardware platform of the BiB according to the installation information.

The software package transmission module 203 included in the BiB 100 is provided to transmit the software package to at least one client terminal. It is a module needed when the end user instructs the BiB through remote console to install software in the client terminal. In one embodiment, module 203 transmits the installation files of the software to a specified client terminal, so as to implement the installation command of the software at the client terminal and initialize the software. In another embodiment, module 203 copies the installed software environment as a whole to a specified client terminal. Specifically, for example, the end user of BiB 100 may be an IT network administrator of a bank system, who wants to install the bank management software in some of the computer terminals in the bank system. In such a case, he can include in the installation request information the IP address of the computer terminals in which the software is to be installed. In the case that the software has been installed in the BiB hardware platform, the software package transmission module 203 can push the whole software installation environment to the computer terminals corresponding to the IP addresses, so that the administrator doesn't have to install the software into the plurality of computer terminals one by one.

Moreover, in another embodiment, the BiB 100 further includes a software upgrade module (not shown), configured to execute the software upgrade service.

Types of software that can be installed in the BiB comprise: operation system, e.g. Windows, Linux; managing software, e.g. IBM System Director; general purpose application software, e.g. MySQL, DB2, etc.; and special professional application software, e.g. bank application software, retail application software, etc. Among the four types of software, general purpose application software and special application software can be specified by the user and installed by the BiB integration server 120 of the BiB. Once the software has been installed in a certain hardware platform of BiB, the BiB integration server 120 further manages the installed software consequently.

Specifically, the BiB integration server 120 preferably further includes a software recording module (not shown), configured to record the inventory of software installed in the BiB hardware platform. When a new piece of software is installed into the hardware platform or the existing software is changed, the software recording module timely updates the software inventory and can provide the inventory to the end user.

Further, the BiB integration server 120 also preferably includes a performance analysis module (not shown), configured to analyze the performance of the BiB hardware platform. In order to realize seamless integration and high usability of various software, the BiB will implement backup installation or duplicated installation of a piece of software on a backup hardware platform, and guarantee the usability of the BiB by taking over the crashed hardware platform. Thus the performance analysis module is required to analyze the operation status of each hardware platform and maintain performance lists for these hardware platforms. Specifically, the performance lists include a list of active hardware platforms, a list of backup hardware platforms and a list of crashed hardware platforms. The backup hardware platforms must keep data synchronization with the active hardware platforms, so as to take over the active hardware platforms as necessary. Therefore, the performance analysis module executes a synchronization mechanism based on a certain policy to guarantee the synchronization and consistence of the data. The attributes of the policy include the time interval between the data operation in the active hardware platform and the backup hardware platform, the percentage of reliability, etc. The policy and attributes are usually specified by the administrator of the BiB through a GUI. Once the policy has been set, the performance analysis module controls a timer to set the data backup operations between the active hardware platforms and the backup hardware platforms. If time interval is set by the administrator as the attribute of the policy, the performance analysis module monitors the time interval between data in active and backup platforms, and carries out data synchronization according to the time intervals. If the administrator sets the percentage of reliability as the attribute of the policy, the performance analysis module first maps the percentage of reliability to time intervals according to an internal policy, then carries out synchronization using the time intervals. When the performance analysis module finds out a crash in a certain active hardware platform, it removes the hardware platform from the list of active hardware platforms and adds it into the list of crashed hardware platforms, and meanwhile, it removes the backup hardware platform of the hardware platform from the list of backup hardware platforms and adds it to the list of active hardware platforms, so as to enable the backup hardware platform to take over the crashed hardware platform, and enable all the applications that were running on the crashed hardware platform to start to run on the backup hardware platform using the data already synchronized on the backup hardware platform. When the crashed hardware platform is recovered, the performance analysis module can enable the recovered hardware platform to take over the backup hardware platform according to a similar method, thus making it a primary and active hardware platform again. Once been re-taken over, the backup hardware platform becomes a stand-by one again. In this process, the re-take over time can be a part of the policy attributes for the decision of whether to implement the re-take over. In an embodiment, in order to realize the above function, the performance analysis module may monitor a plurality of systems and graphically display the result using the system monitor function of Director, and comprehend the operation status of all the hardware platforms in the system using the hardware status function of Director.

Further more, in an embodiment, the BiB integration server 120 also includes a network configuration module (not shown), configured to manage the network configuration of BiB's whole system, e.g. to simplify the internal network configuration of the BladeCenter realizing the BiB by using existing network management software Vyatta. In another embodiment, the BiB integration server 120 further includes a user management module (not shown), configured to realize the management of users of BiB through the user management service of Linux. In another embodiment, the BiB integration server 120 further includes a storage management module (not shown), configured to realize the management of storage integrated in the hardware platform, e.g. a BladeCenter, through for example, IBM's low level storage management package. In another embodiment, the BiB integration server 120 further includes an alarm service module (not shown), configured to judge the operation status of the system, and sound an alarm when the operation status reaches a certain standard.

It can be understood that the BiB integration server 120 can reside in an independent hardware platform that includes all the modules realizing the installation function and all the modules realizing the management functions. Alternatively, the BiB integration server 120 can also share a hardware platform with other software, with the function modules installed onto the same hardware platform together with other software. Or the function modules can be distributed in a plurality of hardware platforms, jointly realizing the function of the BiB integration server 120.

Figure 3:
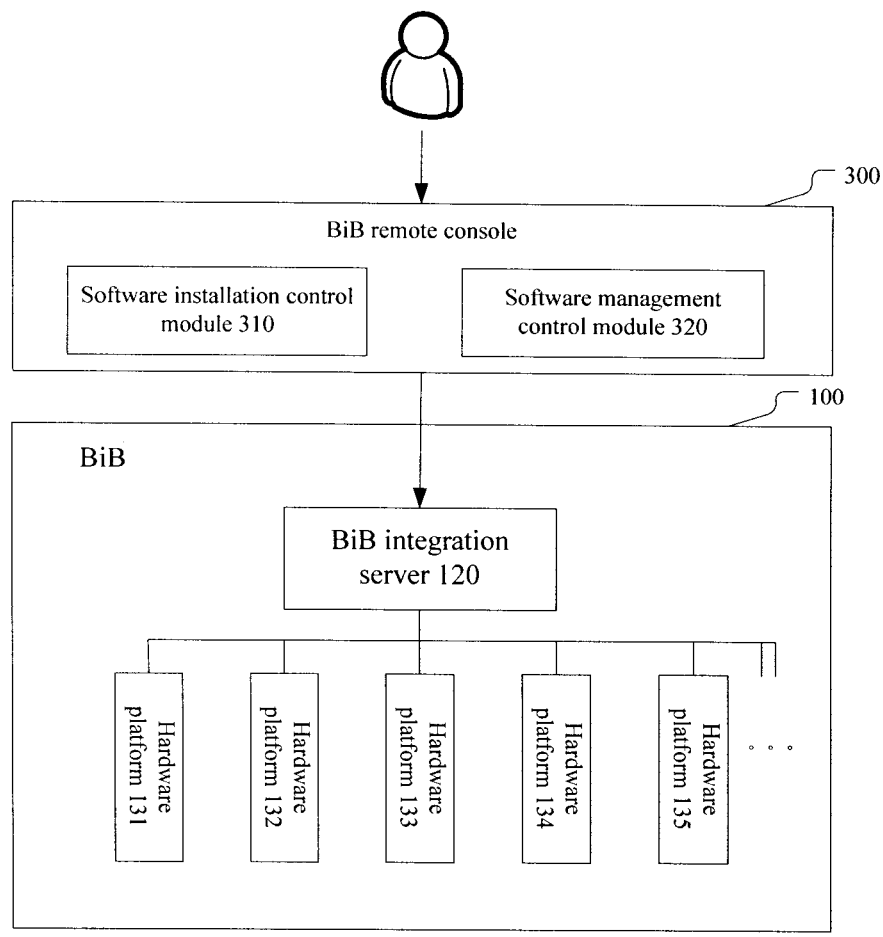
FIG. 3 is an illustration of architecture of the BiB service system according to another embodiment of the present invention.

In order to realize remote control of the BiB, also provided in the present invention is the BiB service system. FIG. 3 illustrates the architecture of the BiB service system according to an embodiment of the present invention. The same units and components in FIG. 3 with FIG. 1 are indicated by the same reference number. As shown in the figure, the BiB service system includes the BiB 100 and the BiB remote console 300, wherein the BiB 100 is the same with the apparatus 100 shown in FIG. 1 (in which the BiB console is omitted), the BiB integration server 120 included in the BiB 100 is the same with that shown in FIG. 2. The BiB remote console 300 is installed in a general computer of the client terminal, and is linked with the BiB 100, specifically, with the BiB integration server 120 in the BiB 100, thus enabling the end user to interact and communicate with the BiB 100 through the remote console 300.

As shown in the figure, the BiB remote console 300 includes a software installation control module 310 for provision of installation information to the BiB 100, and a software management control module 320 for acquisition of software management information from the BiB and provision of the information to the user. Specifically, the user can input the installation information of software, e.g. the location of the software installation package, the target hardware platform of installation, the packaging configuration information and the like, through the software installation control module 310, and then the software installation control module 310 transmits the installation information through various transmission means to the BiB integration server 120. The software management control module 320 is configured to acquire the management information of software, e.g. the inventory of software, the performance analysis report of hardware platforms, alarm information and the like, from the BiB integration server 120, and to display the management information to the user. It can be understood that the communication between the BiB remote console and the BiB 100 can employ various means known to the art, e.g. through various protocols, such as FTP, HTTP, etc, either wired or wireless. Through the remote console, the end user can install needed software in the client terminal hardware as desired, and acquire the operation status information of each software and hardware in the BiB.

Figure 4:
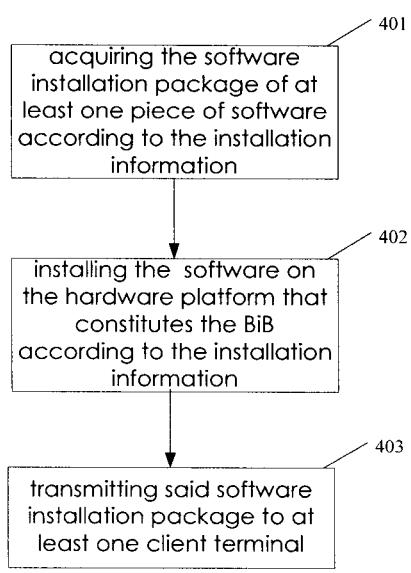
FIG. 4 is an illustration of a flowchart of the BiB integration method according to an embodiment of the present invention.

Based on the same invention conception, also provided in the present invention is a method for BiB integration. FIG. 4 illustrates a flowchart of the BiB integration method according to an embodiment of the present invention. As shown in the figure, the BiB integration method comprises step 401, in which the software installation package of at least one piece of software is acquired according to the installation information, step 402, in which the software is installed on at least one hardware platform that constitutes the BiB according to the installation information, and step 403, in which the software package is transmitted to at least one client terminal.

Specifically, as described above, the installation information may include: name of the software, location of the software installation file, software configuration information, target hardware platform, etc. The installation information can be acquired from the BiB owner through the BiB console, or from the end user through the remote console. According to the information of software to be installed specified in the installation information, the step of acquiring the software installation package can comprise acquiring the installation package from a plurality of sources. In one embodiment, the software installation package to be installed specified in the installation information already existed in the BiB hardware platform. In this case, the step of acquiring the software package includes polling or searching out the software installation package from the BiB hardware platform. In another embodiment, the software installation package is stored in a remote hardware, e.g. a remote server. In this case, the address of the remote server is usually included in the installation information. Correspondingly, the step of acquiring the software package includes acquiring the software installation package from the remote server according to the address specified in the installation information. The communication and data transmission with the remote server can employ various means known to the art, e.g. through various protocols such as FTP, HTTP, etc, either wired or wireless. The software installation package may include the install files of the software, the software image files, packaging configuration files and the like that are used for the installation of the software.

After the acquisition of the software installation package, step 402 is executed to implement the installation of the software according to the installation information. In one embodiment, the installation information includes information of the target hardware specified by the BiB owner or the end user, e.g. one or more blade servers that constitute the BiB. In this case, in step 402, according to such target hardware information, the software is installed in the specified one or more blade servers. In another embodiment, the owner of BiB or the end user doesn't specify a certain hardware platform to install the software. In this case, in step 402, one or more platforms are chosen to host the installation of the software according to the operation status of each hardware platform. In yet another embodiment, in order to ensure silence installation, the installation information includes the packaging configuration information of the software provided by the end user or the owner of BiB. Specifically, the packaging configuration information may be recorded in a flat file. In this case, in step 402, the software is silently installed in certain hardware platforms according to the installation information.

The integration method of BiB also includes a step 403 for software package transmission. In this step, the software package is transmitted to at least one client terminal. This is a step needed when the end user instructs the BiB to install software to the client terminals. In one embodiment, the software package transmission step includes transmitting the software installation files to the specified client terminals, so as to execute the installation command of the software in the client terminals and to initialize the configuration of the software. In another embodiment, the software package transmission step includes integrally copying the installed software environment to the specified client terminals.

In order to realize the management of software, the integration method of BiB may further include the steps of software management.

Specifically, the integration method of BiB may include the step of recording the software (not shown). In this step, the software installed on the BiB hardware platform is recorded in the form of software inventories. When new software is installed into the hardware platform or the existing software is changed, this step can further include updating the inventory of the software and providing the inventory to the end users.

Further, the integration method of BiB also includes a performance analysis step (not shown). As described above, in order to achieve high usability, the BiB would perform backup installation or duplicated installation for a piece of software in a backup hardware platform and guarantee the usability of BiB by taking over the crashed hardware platform. It is thus necessary to analyze the operation status of each hardware platform and to maintain the performance list of these hardware platforms. Specifically, the performance list includes a list of active hardware platforms, a list of backup hardware platforms and a list of crashed hardware platforms. More specifically, the flowchart of performance analysis step is shown in FIG. 5.

Figure 5:
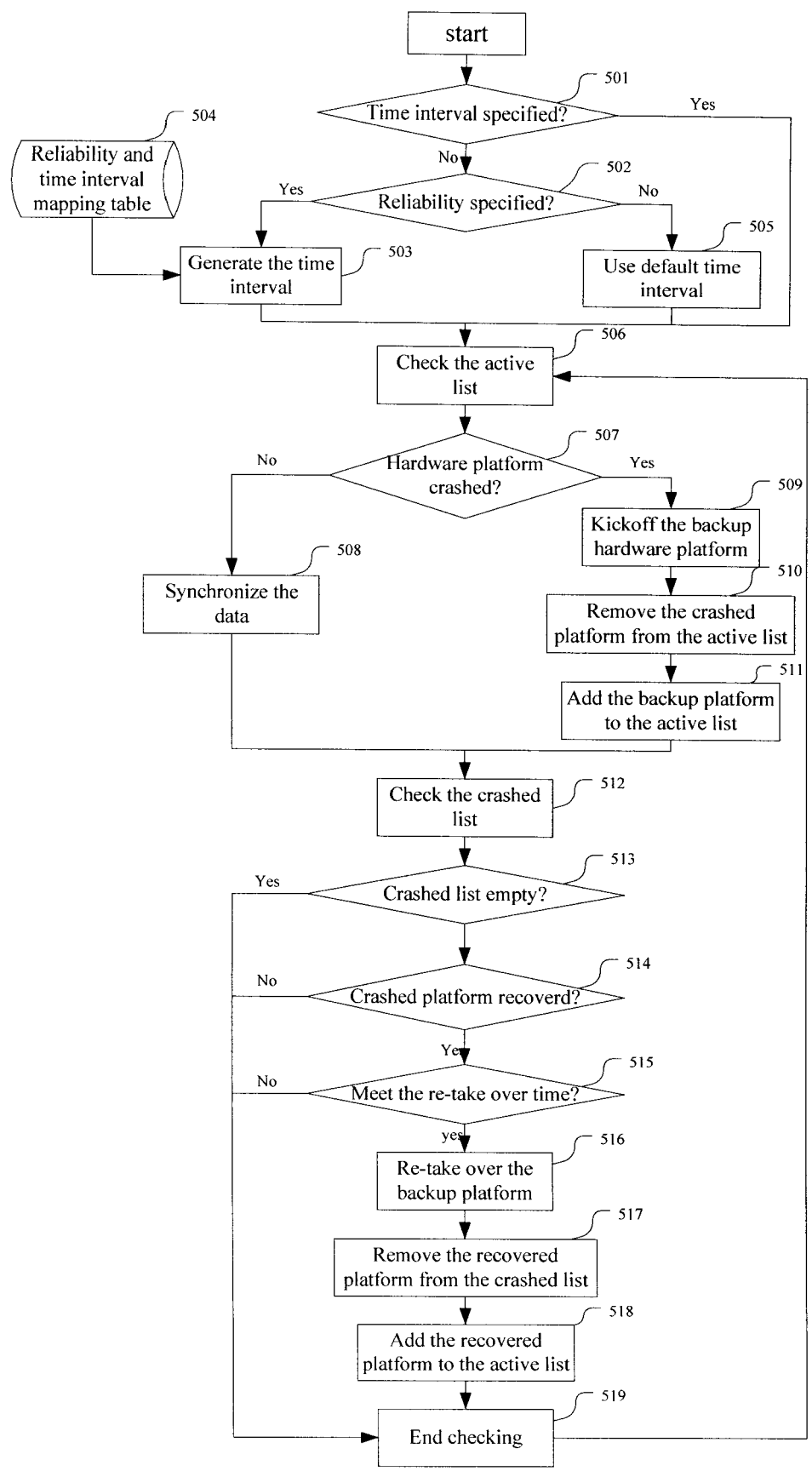
FIG. 5 is an illustration of a flowchart of performance analysis according to another embodiment of the present invention.

FIG. 5 illustrates the flowchart of performance analysis according to an embodiment of the present invention. In this performance analysis flowchart, first the policy on which the data synchronization mechanism is based is determined, then the synchronization status of the data in the hardware platforms is checked according to the policy, and the operation status of each hardware platform is checked. Here, the attributes of the policy include the time interval between the data operated in the active hardware platform and the backup hardware platform, the percentage of reliability, etc. The policy and attributes are usually input by the administrator of the BiB.

Specifically, in step 501, it is to determine whether the synchronization time interval has been specified. If it has been specified, then the process proceeds directly to step 506 to check the active hardware platforms; if it hasn't been specified, then the process proceeds to step 502 to determine whether the percentage of reliability has been specified as the attribute. If yes, then it proceeds to step 503 and generates a time interval corresponding to the specified percentage of reliability by looking up the mapping table between reliability and time intervals, and then proceeds to step 506. If the percentage of reliability has not been specified, then it proceeds to step 505, employing the default synchronization time interval as the attribute and then proceeds to step 506.

In step 506, each hardware platform in the list of active hardware platforms is checked. Then in step 507, it is determined whether a crash occurs in the hardware platform being checked, such as system breakdown, frozen, etc. If the hardware platform being checked runs well without crash, then it proceeds to step 508 and perform data synchronization between the active hardware platforms and the backup hardware platforms, then proceeds to step 512 to start the check of crashed hardware platforms. If a crash is found in a certain hardware platform in step 507, then it proceeds to step 509 to startup or kickoff the corresponding backup hardware platform, then in step 510, to delete the crashed primary hardware platform from the list of active hardware platforms, and in step 511, to add the activated backup hardware platform into the list of active hardware platforms. After checking each active hardware platform, it begins to check the list of crashed hardware platforms, as shown in step 512. First in step 513, it is to determine whether the list of crashed hardware platforms is empty. If it is empty, it means no crash occurs in the hardware platforms and the process directly proceeds to step 519 to end the check. If the list is not empty, it proceeds to step 514 to determine whether the crashed hardware platform has been recovered. If it has not been recovered, then the process proceeds to step 519 and ends the check. If the hardware platform has been recovered, then it proceeds to step 515 to determine whether the re-take over time is met. If the time is not met, then it proceeds to step 519 and ends the check. If the re-take over time is met, then the process proceeds to step 516 to perform the re-take over of hardware platforms, i.e. to make the hardware platform that crashed and has been recovered to take over the running backup hardware platform. Once the re-take over has been performed, it is necessary to execute step 517 to delete the recovered hardware platform from the list of crashed hardware platforms, and step 518 to add the recovered hardware platform into the list of active hardware platforms. By performing similar checks to each of the hardware platforms in the list of crashed hardware platforms, the check of the list of crashed hardware platforms can be completed. Finally the round of check is ended in step 519 and a new round of check can be started by jumping to step 506 when necessary.

Through the process of performance analysis described above, it is guaranteed the high reliability and usability of the BiB. Moreover, in order to realize complete management of the BiB, the integration method of BiB can further include a plurality of management steps. In one embodiment, the integration method of BiB can further include a network configuration step (not shown), for configuring the network of the whole system of BiB. In another embodiment, the integration method of BiB further includes a user management step, for realizing the BiB user management through for example, the user management service of Linux. In yet another embodiment, the integration method of BiB further includes a storage management step, for managing the storage integrated in the hardware platform, e.g. a blade box, through for example, IBM's low level storage management package. In yet another embodiment, the BiB integration method further includes an alarm step, for judging the operation status of the system, and sounding an alarm when the operation status reaches a certain standard.

It can be understood that the BiB 100 according to an embodiment of the present invention in FIG. 1 can realize the method shown in FIG. 4. Through the apparatus and method described above, it is realized flexible integration of hardware and software allowing a third party to freely plug in new software.

In the embodiments described above, the hardware platform of BiB can be various hardware known to the art such as VLSI or gate arrays, or semiconductors such as logic chips and transistors, or hardware circuits of programmable hardware apparatuses such as FPGA, programmable logic device, and combinations of the hardware above. The methods described above can be implemented by executable instructions and/or controlling codes in the processors.

The method and apparatus of BiB integration of the present invention has been described in details above in combination with embodiments, but it is not meant to be limitation to the present invention. Those skilled in the art can understand that, modifications, alternatives and amendment can be performed without deviating from the spirit and scope of the present invention defined by the below claims.

What is claimed is:

1. An integration server connected directly to at least one hardware platform and to a business-in-a-box (BiB) console, said server comprising:
    a software package acquisition module, said acquisition module being configured to receive a software installation information from an end user via a remote console being connected to said BiB, and acquire a software installation package of at least one piece of software from a location specified by said software installation information;
    a software installation module, said installation module being configured to install said at least one piece of software on said at least one hardware platform of said BiB; and
    a software package transmission module, said transmission module being configured to, when being instructed by said end user to install said at least one piece of software on at least one client terminal, transmit said software installation package acquired by said acquisition module from said location to said at least one client terminal so as to execute command of said installation and initialize configuration of said at least one piece of software on said at least one client terminal.

2. The integration server according to claim 1, wherein said installation information comprises at least one of followings: name of the piece of software, location of installation files of the piece of software, software configuration information, and target hardware platform.

3. The integration server according to claim 1, wherein said software installation package is a software image file.

4. The integration server according to claim 1, wherein said software package acquisition module is configured to acquire said software installation package from one of the followings: said at least one hardware platform that constitutes the BiB; and a remote hardware platform.

5. The integration server according to claim 1, further comprising a performance analysis module, configured to analyze performance of said at least one hardware platform that constitutes the BiB.

6. The integration server according to claim 5, wherein said performance analysis module is configured to maintain a performance list for said at least one hardware platform that constitutes the BiB.

7. The integration server according to claim 6, wherein said performance list comprises: a list of active hardware platforms, a list of backup hardware platforms, and a list of crashed hardware platforms.

8. The integration server according to claim 6, wherein said performance analysis module is configured to start a backup hardware platform and update said performance lists when finding out a crashed hardware platform.

9. A business-in-a-box (BiB) service system, comprising:
a BiB apparatus, said BiB apparatus comprises:
an integration server; and
at least one hardware platform,
wherein the integration server further comprises:
a software package acquisition module, said acquisition module being configured to receive a software installation information from an end user via a remote console being connected to said BiB, and acquire a software installation package of at least one piece of software from a location specified by said software installation information;
a software installation module, said installation module being configured to install said at least one piece of software on said at least one hardware platform according to said installation information; and
a software package transmission module, said transmission module being configured to transmit said software installation package acquired by said acquisition module from said location to at least one client terminal upon being instructed by said end user so as to execute command of said installation and initialize configuration of said at least one piece of software on said at least one client terminal.

10. The BiB service system according to claim 9, further comprising a BiB remote console that controls said BiB apparatus.

11. The BiB service system according to claim 10, wherein said BiB remote console comprises a software installation control module for providing said installation information to said BiB apparatus, and a software management control module for acquiring the management information of the software from said BiB apparatus, and providing said management information to a user.

12. A business-in-a-box (BiB) integration method, comprising:
acquiring a software installation package of at least one piece of software according to an installation information;
installing said at least one piece of software on at least one hardware platform that constitutes the BiB according to said installation information; and
transmitting said software installation package to at least one client terminal.

13. The method according to claim 12, wherein said installation information comprises at least one of the followings: name of the software, location of installation files of the software, software configuration information, and target hardware platform.

14. The method according to claim 12, wherein said software installation package is a software image file, and wherein transmitting said software installation package causes both command of said installation being executed and configuration of said at least one piece of software being initialized, all on said at least one client terminal.

15. The method according to claim 12, wherein acquiring said software installation package comprises acquiring said software installation package from said at least one hardware platform that constitutes the BiB or from a remote hardware platform.

16. The method according to claim 12, further comprising analyzing a performance of said at least one hardware platform that constitutes the BiB.

17. The method according to claim 16, wherein said analyzing the performance of said at least one hardware platform comprises: maintaining performance lists for said at least one hardware platform that constitutes the BiB.

18. The method according to claim 17, wherein said performance lists comprises: a list of active hardware platforms, a list of backup hardware platforms, and a list of crashed hardware platforms.

19. The method according to claim 17, wherein said analyzing the performance of said at least one hardware platform comprises: starting a backup hardware platform and updating said performance lists when finding out a crashed hardware platform.

* * * * *